United States Patent Office 3,098,745
Patented July 23, 1963

3,098,745
GROWTH-PROMOTING METHOD EMPLOYING
3,3-BIS(4-HYDROXY-PHENYL)PENTANE
Granville B. Kline and Robert Q. Thompson, Greenwood, Ind., assignors to Eli Lilly and Company, Indianapolis, Ind., a corporation of Indiana
No Drawing. Filed Dec. 21, 1961, Ser. No. 161,289
3 Claims. (Cl. 99—2)

This invention relates to nonhormonal compositions for increasing the growth rate and weight gain of animals and to methods of using these compositions for such purpose. In particular, this invention relates to methods and growth-promoting compositions having utility in growing and fattening beef cattle and sheep by producing high-quality meat at an accelerated rate with a reduced amount of feed.

At present the most important commercial growth promoter is diethylstilbestrol. However, this compound is an estrogen, and, although proper dosages do not produce the inherent, undesirable side effects of estrogenic substances, a great expenditure of research effort has been directed to finding nonestrogenic growth stimulators. Antibiotics have provided the most fruitful area of research; however, none have achieved the commercial significance of diethylstilbestrol.

An object of this invention is to provide a growth-promoting composition containing a nonestrogenic, nonantibiotic growth-promoting active constituent which has an activity paralleling that of diethylstilbestrol. Another object of this invention is to provide a method for increasing the growth rate and weight gain in animals—in particular, beef cattle and sheep. A further object of this invention is to promote growth without causing undesirable physiological side effects and, at the same time, produce at least as good, if not superior, quality meat as that produced in the absence of treatment. Another object of this invention is to provide a method for producing growth-promoting compositions. These and other objects of this invention appear more fully hereinafter.

In accordance with the present invention there is provided a composition, suitable for administering to an animal, wherein the improvement comprises employing in said composition a growth-promoting quantity (i.e., a physiologically adequate portion) of 3,3-bis(4-hydroxyphenyl)pentane. Although the growth-promoting compositions of this invention can be administered by implantation or by injection, in general, the compositions are administered orally, and thus preferably comprise a major proportion of an ingestible carrier material and a minor, but physiologically adequate, proportion of 3,3-bis(4-hydroxyphenyl)pentane. The ingestible carrier can be (1) a complete ration, i.e., an animal feed nutritionally adequate per se; (2) an animal feed supplement; (3) a nutrient; or (4) an inert carrier. Thus, for example 3,3-bis(4-hydroxyphenyl)pentane can be administed or combined with any of the usual animal feeds or feed supplements in such amount that it is present in the feed or supplement in an amount of about 1 to 20 grams per ton—preferably about 2 to 10 grams per ton. The administration of 3,3-bis(4-hydroxyphenyl)pentane to animals in physiologically adequate amounts exerts a growth-promoting action through greater feed consumption and improved appetite in conjunction with more efficient feed utilization and a concomitant conversion of feed to rate of growth and weight gain.

The compositions of this invention have the particular advantage of being nonestrogenic substances. Hence, it is possible to administer these compounds over a broad range of dosages to achieve the desired growth-promoting characteristics without fear of producing the inherent, undesirable side effects experienced in estrogenic substances, such as excessive sexual stimulation, including mammary development and lactation, as well as other undesirable physiological side effects, such as lowering of meat quality.

The fact that 3,3-bis(4-hydroxyphenyl)pentane stimulates growth in animals closely approximating diethylstilbestrol is highly unexpected, since the growth stimulation of diethylstilbestrol has popularly been thought to be due wholly to its estrogenic activity. Based on this theory, it is most unusual that a nonestrogen, such as 3,3-bis(4-hydroxyphenyl)pentane, exhibits such high growth-promoting activity.

An embodiment of this invention is a method of growing and fattening animals which generally comprises orally administering the growth-promoting compositions of this invention to the animals at spaced intervals of time and regulating the quantities of feed composition to accelerate the rate of weight gain. In this manner, more meat can be produced in the same time using a reduced amount of feed without impairing the quality of the meat. Thus, the process of this invention comprises administering a composition containing 3,3-bis(4-hydroxyphenyl)-pentane in growth-promoting quantities to an animal.

The growth-promoting compositions of this invention have applicability to a wide number of animals, such as dogs, cats, and horses, but, naturally, are of greatest significance with respect to those animals of economic importance, as, for example, swine, ruminants, and poultry—ruminants being preferred because of their great commercial importance.

The following example, in which all parts and percentages are by weight, further demonstrates this invention. In this example nutritionally adequate per se feed rations were employed. These animal feeds are hereinafter designated as lamb basal rations and are further characterized by the letter designations "A" and "B." Tables I and II set forth the compositions of basal rations A and B.

TABLE I

*Lamb Basal Ration A*

| Ingredient | Percent of Ration | Pounds per Ton |
|---|---|---|
| Corn, yellow | 31.00 | 620 |
| Cobs, corn | 37.50 | 750 |
| Alfalfa meal, dehydrated 17 percent | 11.00 | 220 |
| Soybean oil meal, solvent extracted dehulled 50 percent | 7.75 | 155 |
| Cottonseed meal, solvent extracted 41 percent | 1.75 | 35 |
| Urea, feeding grade | .52 | 10.50 |
| Distillers' dried grains with solubles (corn) | 1.75 | 35 |
| Molasses, cane | 7.50 | 150 |
| Dicalcium phosphate, feed grade | .53 | 10.50 |
| Calcium carbonate | .35 | 7 |
| Salt (NaCl) | .35 | 7 |
| Minerals (trace) [1] | .06 | 1.125 |
| Vitamin D₂ premix [2] | .05 | 1 |
| Total | 100.11 | 2,002.125 |

[1] See footnote (1) under Table II.
[2] See footnote (2) under Table II.

TABLE II

*Lamb Basal Ration B*

| Ingredient | Percent of Ration | Pounds per Ton |
|---|---|---|
| Corn, yellow | 56.00 | 1,120 |
| Cobs, corn | 20.00 | 400 |
| Alfalfa meal, dehydrated 17 percent | 3.00 | 60 |
| Soybean oil meal, solvent extracted dehulled 50 percent | 6.50 | 130 |
| Cottonseed meal, solvent extracted 41 percent | 1.50 | 30 |
| Urea, feeding grade | .45 | 9 |
| Distillers' dried grains with solubles (corn) | 1.50 | 30 |
| Molasses, cane | 10.00 | 200 |
| Dicalcium phosphate, feed grade | .45 | 9 |
| Calcium carbonate | .30 | 6 |
| Salt (NaCl) | .30 | 6 |
| Minerals (trace) [1] | .06 | 1.125 |
| Vitamin $D_2$ premix [2] | .05 | 1 |
| Total | 100.11 | 2,002.125 |

[1] CCC Trace Mineral Premix contains: 12.20 percent manganese as manganese sulfate, 0.38 percent iodine as potassium iodide, 0.26 percent cobalt as cobalt sulfate, 9.60 percent iron as ferrous sulfate and ferrous carbonate and red iron oxide (for color), 0.73 percent copper as copper carbonate, 5.00 percent zinc as zinc sulfate and zinc oxide, and 6.38 percent calcium as calcium carbonate.

[2] Each pound contains 510,000 USP units vitamin $D_2$. Premix made by adding one pound of 64,000,000 USP units per pound irradiated yeast to 125 pounds of soybean feed.

EXAMPLE I

This example compares the effects on growth rate and feed efficiency of lambs receiving a nutritionally adequate per se basal ration (negative control), and lambs receiving said ration containing diethylstilbestrol (positive control), with lambs receiving a ration containing the growth-promoting ingredient of this invention, 3,3-bis(4-hydroxyphenyl)pentane.

The feeding procedure employed an experimental design of the block design type, utilizing a randomization method of allotment. The lambs employed were eight-month, Texas white-face wethers. (Each lamb was fed for a two-week conditioning period and then weighed, identified, and drenched with two ounces of phenoarsenate.) These lambs were divided into five lots of ten lambs each, and one lot containing nine lambs. In the negative control, two lots of ten lambs each were fed basal ration B for six days and basal ration A for the duration (see Tables I and II for the composition of basal rations A and B). The positive control comprised two lots of nine and ten lambs each, which were fed basal ration B plus 2 mg. per head per day of diethylstilbestrol for six days, and basal ration A plus 2 mg. per head per day for the duration of the test period. Additionally, two lots of ten lambs each were fed basal ration B plus 2 mg. per head per day of 3,3-bis(4-hydroxyphenyl)pentane for six days, and basal ration A plus 2 mg. per head per day of 3,3-bis(4-hydroxyphenyl)pentane for the duration. The total test period was 42 days. The results of the experiment are set forth in Table III.

Table III

*Daily Gain and Feed Efficiency Data*

3,3-BIS(4-HYDROXYPHENYL)PENTANE

| | Number of Animals | Avg. Daily Gain, Lbs. | Feed Efficiency [4] |
|---|---|---|---|
| Negative Control [1] | 20 | 0.51 | 13.1 |
| Positive Control [2] | 19 | 0.54 | 14.1 |
| Test Material [3] | 20 | 0.57 | 14.2 |

[1] Basal ration.
[2] Basal ration plus 2 mg. diethylstilbestrol.
[3] Basal ration plus 2 mg. 3,3-bis(4-hydroxyphenyl)pentane.
[4] Weight gained per unit of feed consumed, expressed as percentage.

Thus, in the example, 3,3-bis(4-hydroxyphenyl)pentane in feed at levels of 2 mg. per head per day improved rate of gain 11.8 percent, when compared to the negative control basal ration (0.57 vs. 0.51 pound), and was 5.6 percent better than diethylstilbestrol (0.57 vs. 0.54 pound). Feed efficiency was improved 8.4 percent, when compared to the negative control (14.2 vs. 13.1), and was better than diethylstilbestrol (14.2 vs. 14.1).

Likewise, in experiments on cattle, 3,3-bis(4-hydroxyphenyl)pentane significantly improves rate of gain, when compared to the negative control. Typical basal cattle rations employed in cattle feed experiments are set forth in Tables IV and V.

Table IV

*Cattle Ration No. 1*

| Ingredient | Percent of Ration | Pounds per Ton |
|---|---|---|
| Corn, yellow | 41.00 | 820 |
| Cobs, corn | 35.00 | 700 |
| Alfalfa meal, dehydrated 17 percent | 3.00 | 60 |
| Soybean oil meal, solvent extracted dehulled 50 percent | 6.50 | 130 |
| Cottonseed meal, solvent extracted 41 percent | 1.50 | 30 |
| Urea, feeding grade | .45 | 9 |
| Distillers' dried solubles (corn) | 1.50 | 30 |
| Molasses, cane | 10.00 | 200 |
| Dicalcium phosphate, feed grade | .45 | 9 |
| Calcium carbonate | .30 | 6 |
| Salt (NaCl) | .30 | 6 |
| Minerals (trace) [1] | .05 | 1 |
| Vitamin A and $D_2$ premix [2] | .05 | 1 |
| Total | 100.10 | 2,002 |

[1] See footnote (1) under Table V.
[2] See footnote (2) under Table V.

Table V

*Cattle Ration No. 2*

| Ingredient | Percent of Ration | Pounds per Ton |
|---|---|---|
| Corn, yellow | 61.00 | 1,220 |
| Cobs, corn | 20.00 | 400 |
| Alfalfa meal, dehydrated 17 percent | 3.00 | 60 |
| Soybean oil meal, solvent extracted dehulled 50 percent | 6.50 | 130 |
| Cottonseed meal, solvent extracted 41 percent | 1.50 | 30 |
| Urea, feeding grade | .45 | 9 |
| Distillers' dried solubles (corn) | 1.50 | 30 |
| Molasses, cane | 5.00 | 100 |
| Dicalcium phosphate, feed grade | .45 | 9 |
| Calcium carbonate | .30 | 6 |
| Salt (NaCl) | .30 | 6 |
| Minerals (trace) [1] | .05 | 1 |
| Vitamin A and $D_2$ premix [2] | .05 | 1 |
| Total | 100.10 | 2,002 |

[1] CCC Trace Mineral Premix contains: 10.00 percent manganese as manganese sulfate, 0.30 percent iodine as potassium iodide, 0.10 percent cobalt as cobalt carbonate, 6.00 percent iron as ferrous carbonate, 1.00 percent copper as copper oxide, 10.00 percent zinc as zinc sulfate and zinc oxide, and 11.50 percent maximum and 8.50 percent minimum calcium as calcium carbonate.

[2] Each pound contains 2,000,000 I.U./lb. vitamin A and 227,200 I.U./lb. vitamin $D_2$.

In general, the procedure employed in feeding cattle follows the method set forth in the previous example for feeding sheep, with the exception that an experimental design of the randomized block type is employed, and the method of allotment is stratification by weight with random assignment to treatment groups according to weight and gain during a conditioning period. The cattle employed are steers—generally Herefords. Each steer is fed for a two-week period on a conditioning ration. The steers are then divided into lots. Each lot is then fed the negative control basal ration. In most cases, a basal ration of the type set forth in Table IV is fed for the first 56 days and then a basal ration similar to that set forth in Table V is fed for the duration of the feeding period. Another lot is fed the same basal rations plus a specified amount of 3,3-bis(4-hydroxyphenyl)pentane in a similar fashion. The total test period is generally 168 days.

The growth-promoting active ingredient, 3,3-bis(4-hydroxyphenyl)pentane, can be administered orally by first combining a very small quantity thereof with an animal feed or feed supplement which is adapted for use in feeding the particular animal; as, for example, a cattle or sheep feed supplement. On growing and fattening beef cattle, a prepared supplement can be fed to the animals. This supplement typically is about 10 percent by weight of the food consumed by the animals per day. Such a prepared feed supplement provides a convenient vehicle for the administration of the active growth-promoting ingredient in accordance with this invention. However, it is to be understood that, if desired, the 3,3-bis(4-hydroxyphenyl)pentane can be incorporated in a complete ration; that is, one nutritionally adequate per se; in other nutrient materials consumed by the animal; in the animal's liquid needs, as, for example, in his water; or in any ingestible nontoxic, inert carrier material.

Because of the nonhormonal and nonantibiotic character of 3,3-bis(4-hydroxyphenyl)pentane, it is possible to administer this compound to animals over a wide range of dosage levels. Although no undesirable effects have been indicated at high-dosage levels, it has been found that dosage levels ranging from about 2 to about 20 grams per ton of the ingestible carrier material (e.g., animal feed or animal feed supplement) produce excellent results. For economic reasons, it is desirable to maintain dosage levels as low as is compatible with maximum growth stimulation. Therefore, it is preferred to employ dosage levels of no greater than 10 grams per ton of ingestible carrier.

In practicing this invention, 3,3-bis(4-hydroxyphenyl)-pentane can conveniently be administered to the growing animal in dosages based on body weight. Generally, dosages of about 0.1 to 10 mg. per 100 pounds of body weight during each 24-hour period of treatment are given, or at least the average dosage per day falls within this range over each 5- to 10-day period of treatment. Higher dosages have not been found to be detrimental; however, economics dictate that as small a dosage should be employed as is compatible with maximum growth stimulation. For this reason, it is preferred to employ a dosage ranging from about 0.1 to about 5 mg. of 3,3-bis(4-hydroxyphenyl)pentane per 100 pounds of body weight over each 24-hour period.

On the basis of feed intake, when the active ingredient is incorporated into the total feed ration (that is, in an animal feed nutritionally adequate per se), the feed material generally can contain from about 0.01 to about 8 mg. per pound of feed material. However, it is preferred to employ from about 0.1 to about 5 mg. per pound of feed material.

A feed supplement can be employed as the vehicle for administering 3,3-bis(4-hydroxyphenyl)pentane to an animal, as, for example, beef cattle or sheep. The following is illustrative of such a composition. The feed supplement can be composed principally of soybean meal and/or other seed meal and alfalfa meal, molasses, minerals, and vitamins. Such supplements are referred to in the trade as protein supplements. The growth-promoting ingredient is readily incorporated in feed supplements by first dissolving the active compound in a vegetable oil, such as cottonseed oil or soybean oil. For example, 10 grams of 3,3-bis(4-hydroxyphenyl)pentane can be dissolved in about 225 grams of oil. The oil solution is then premixed with a measured amount of the feed supplement and, thereafter, the premixed material mixed with the whole body of a measured amount of feed supplement. For example, the above oil solution could be premixed with nine and one-half pounds of supplement and, thereafter, with enough of the supplement to produce a 2,000-pound batch. Such growth-promoting supplements can be fed in various ways; for example, as a top dressing for the complete feed ration or in mixture therewith.

The animal feeds utilized in this invention comprise a basal ration of which a wide variety are offered for the feeding of farm animals. However, there is no universally accepted basal ration formula. In 1950 the National Research Council released recommended minimum nutrient allowances for the early life stages of chicks, poults, pigs, calves, lambs and other farm animals, which nutrients, both in kind and in quantity, are not arbitrarily fixed but are intended to be varied with considerable latitude based on the experience of the producer and user of such feeds.

In order to make pre-eminently clear what is meant by the term "animal feed," the following is given by way of illustration of a basal ration:

Two classes of nutrients are normally constituents of any basal ration of animal feeds and are here referred to as:

(A) Essential constituents, which comprise two classes of nutrients, both of which are recognized as necessary in any basal ration of animal feeds. All such approved basal feeds contain ingredients selected from each of these two classes:

(1) Plant ingredients, which normally constitute from 85 percent to as high as 95 percent by weight of the basal ration and include one or more of the following: corn meal, soybean oil meal, wheat bran, wheat middlings, dehydrated alfalfa meal, ground oats and oat grouts, millet, linseed oil meal, cocoanut oil meal, distillers' dried grains, and the like ground plant products;

(2) Mineral ingredients, which are normally incorporated in the feed in very small amounts of around 1 to 5 percent by weight of the basal ration and include one or more of the following: salts of calcium, phosphorus, manganese, and common salt (NaCl), as well as minute proportions of one or more of the salts of iodine, potassium, magnesium, iron, copper, and the like.

(B) Ancillary constituents, which are optionally added to animal feeds and are alleged to impart to the feeds to which they are added higher nutritional values, and which are here classified as:

(3) Animal ingredients, which may comprise up to as high as 10 percent by weight of the basal ration, although used normally in much smaller amounts, and include fish meal, ground meat scraps, animal fats, dried whey solubles and the like, although it is to be understood that many highly recommended animal feeds contain no animal ingredients or only minute proportions.

(4) Vitamin ingredients, which are added to some, but not all, basal rations in small amounts and include one or more of the vitamins A, $B_{12}$, D and K, as well as materials containing the B vitamins, such as riboflavin, niacin, pantothenic acid or salts thereof, choline, pyridoxine, thiamine, nicotinic acid or salts thereof, biotin, folic acid and the like; and (5) Amino acid ingredients, which are sometimes, but not generally, added to animal feeds in very small amounts and include methionine, phenylalanine, arginine, glycine, histidine, isoleucine, leucine, lysine, threonine, tryptophan, valine and the like.

The term "animal feed" as used in the specification and claims of this application is to be understood to include any basal ration containing ingredients as hereinabove described.

We claim:

1. The method of growing and fattening animals which comprises orally administering 3,3-bis(4-hydroxyphenyl)-pentane to an animal at spaced intervals of time and regulating the quantities of said pentane to accelerate the rate of weight gain, the amount of said compound administered ranging from about 0.1 to about 10 mg. of said compound per 100 pounds of body weight for each 24-hour period.

2. The method of claim 1 wherein said animals are ruminants.

3. The method of growing and fattening animals which comprises orally administering 3,3-bis(4-hydroxyphenyl)-pentane to an animal at spaced intervals of time and regulating the quantities of said compound to accelerate the rate of weight gain.

References Cited in the file of this patent

Miquel: Arch. Int. Pharm. 1958, vol. 117, Nos. 3-4, pages 262-274 (particularly pages 262-266, 268, 270-272).